July 16, 1940.  N. G. ANDERSEN  2,208,239
MACHINE FOR HULLING NUTS
Filed Oct. 17, 1938  4 Sheets-Sheet 2

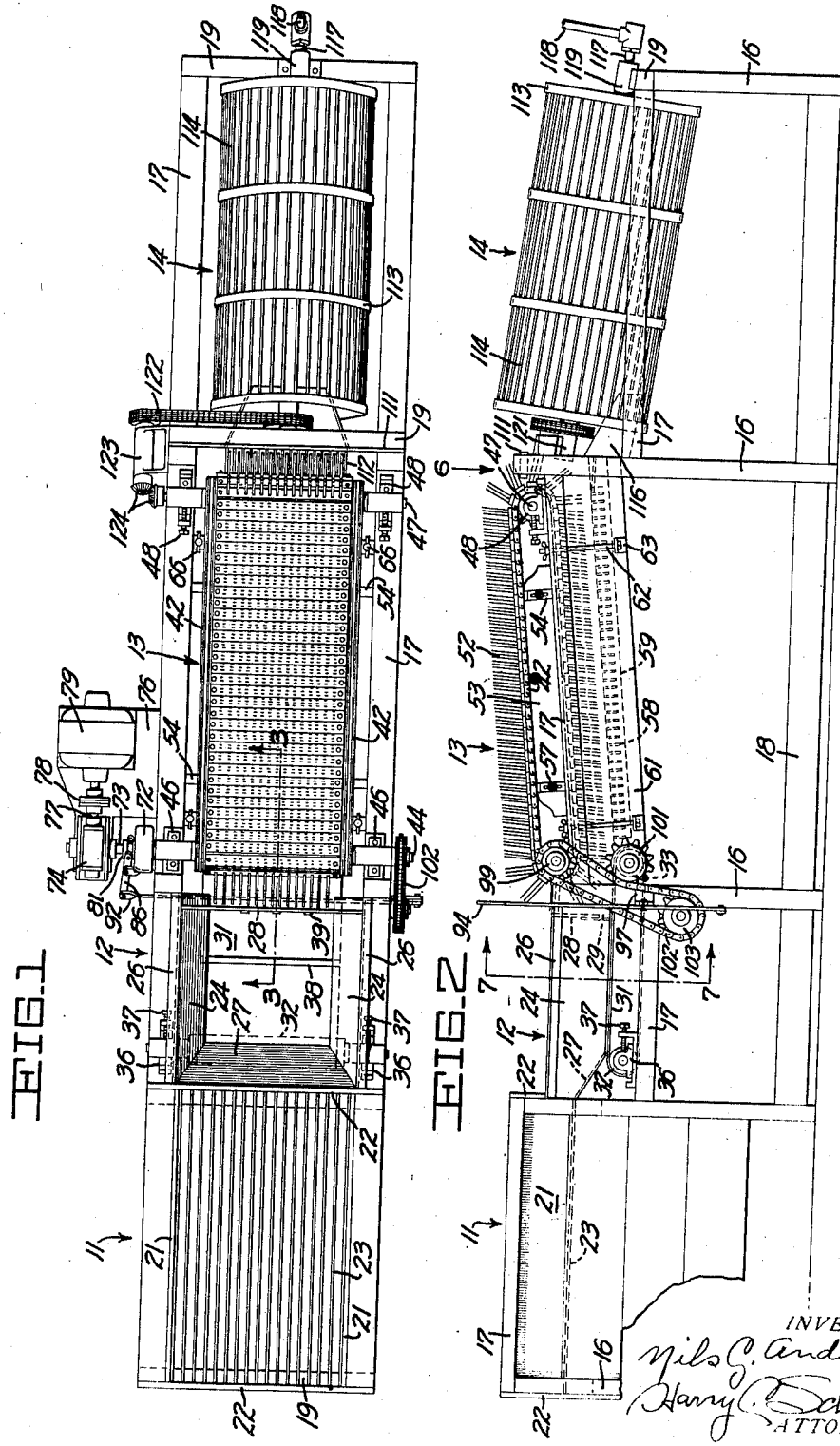

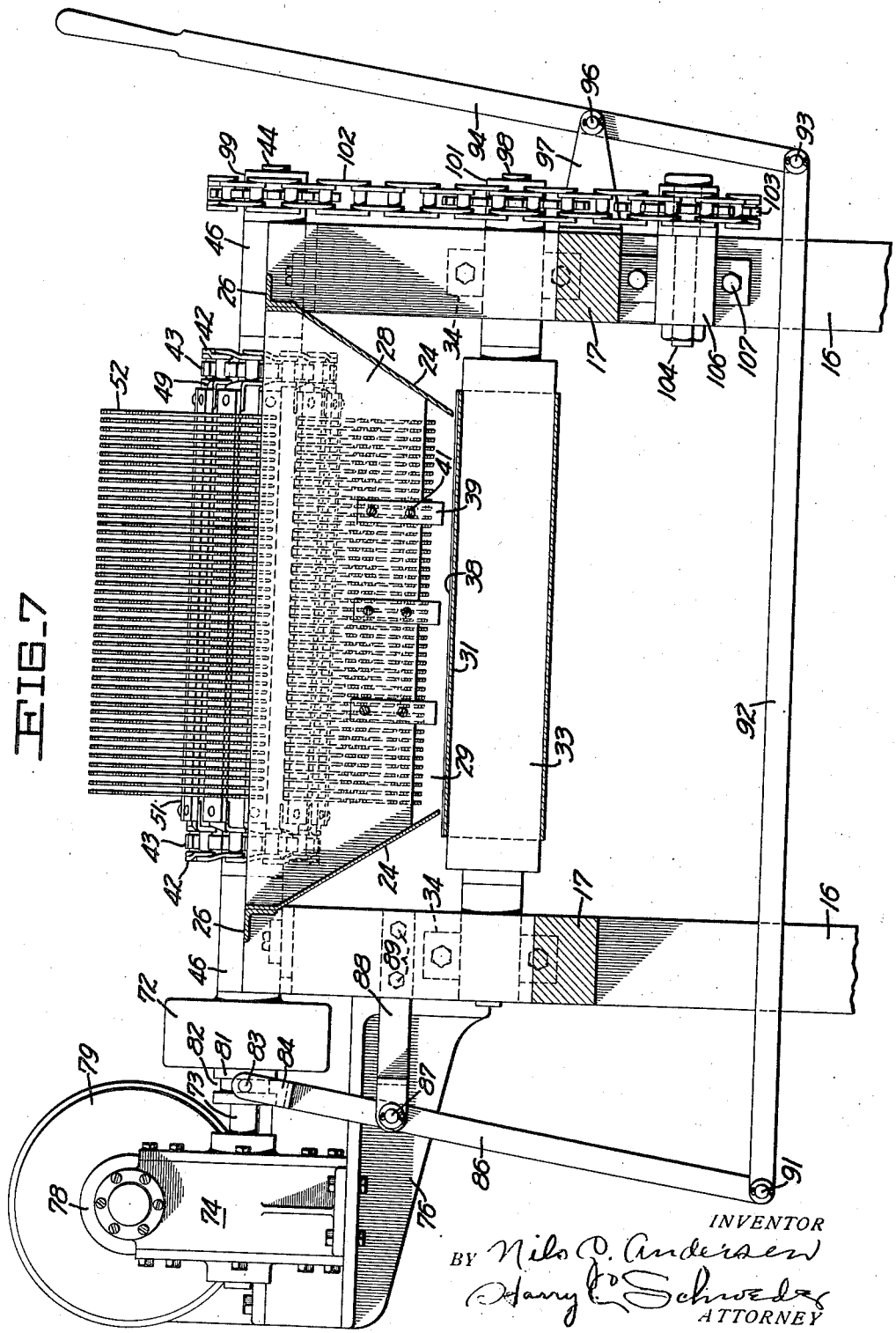

Patented July 16, 1940

2,208,239

UNITED STATES PATENT OFFICE 2,208,239

MACHINE FOR HULLING NUTS

Nils G. Andersen, Walnut Creek, Calif.

Application October 17, 1938, Serial No. 235,298

5 Claims. (Cl. 83—35)

This invention relates to machines for removing from nuts, particularly walnuts, after the latter have been harvested, the husks or hulls in which the nuts are encased during growth.

There are several species of nuts, of which walnuts and hazel-nuts are examples, that grow enclosed in pouches which, upon ripening of the nuts, wither and separate from the nut shells. Sometimes these husks or hulls, as they are commonly known, crack open in numerous places and are then readily removed from the nuts leaving the shells of the latter relatively clean and enhancing their market value. Quite often, however, the nuts are harvested before the husks have completely separated from the nut shells which requires that the nuts be thoroughly cleaned before they are sacked or packaged.

There are available at the present time a number of mechanical devices for cleaning the nuts. Most of these mechanisms employ wire brushes or toothed saw-like blades past which the nuts are moved so that the nut shells are scrubbed by the brush bristles or the aforementioned blades free of any adhering particles of the husks. The above described devices do not operate in a desirably efficient manner. In the machines in which the brushes are used, the individual bristles of the brushes must necessarily be constructed of fine wire so that the bristles may enter the crevices or wrinkles of the nut shell in order to remove from the latter any portions of the husk which may be lodged therein. It is evident that eventually these fine bristles may become so bent that they will interfere with the proper functioning of the machine and, also, that due to the close spacing of the bristles particles of husk will be forced into the brushes until the latter are completely clogged and therefore incapable of further operation. The time consumed during the shut-down period necessary to clear the fouled brushes is considerable. In the machines utilizing saw-like cutters or abrading elements, the passage of nuts having relatively green husks therethrough will quickly clog the mechanism due to the fact that particles of the husk, which is very sticky when not quite dry, will lodge in and fill the valleys between the cutter teeth thereby rendering the cutters incapable, until cleared, of properly cleaning any of the succeeding nuts they may engage.

It is the object of my invention to overcome these and other undesirable features inherent in present available mechanisms for the purpose described by providing:

1. A machine whose husk-removal elements are so constructed as to invite the immediate passage from the machine of portions of the husk as the latter are separated from the nuts.

2. A machine in which clogging or fouling of the husk-cutters is reduced to an absolute minimum.

3. A machine which, being non-fouling, is capable of being operated at greater speed and consequently possesses greater output capacity.

4. A machine in which the husk-cutters are readily removable for replacement or repair.

5. A machine in which the relative positions of co-acting husk-cutters may be quickly adjusted to accommodate different sizes of nuts, and 6. In a machine of the character described, means for "combing-out" the husk-cutting brushes to remove any pieces of husk that may have lodged therein.

The invention possesses other objects and features of advantage which will be specifically set forth in the detailed description of the invention hereunto annexed. It is to be understood that the invention is not to be limited to the specific form thereof herein shown and described as various other embodiments thereof may be employed within the scope of the appended claims.

Referring to the drawings:

Figure 1 is a top plan view of the complete hulling machine of my invention.

Figure 2 is a side elevational view of the structure shown in Figure 1.

Figure 7 is a vertical sectional view of the machine taken in the plane indicated by the line 7—7 of Figure 2.

Figure 3:
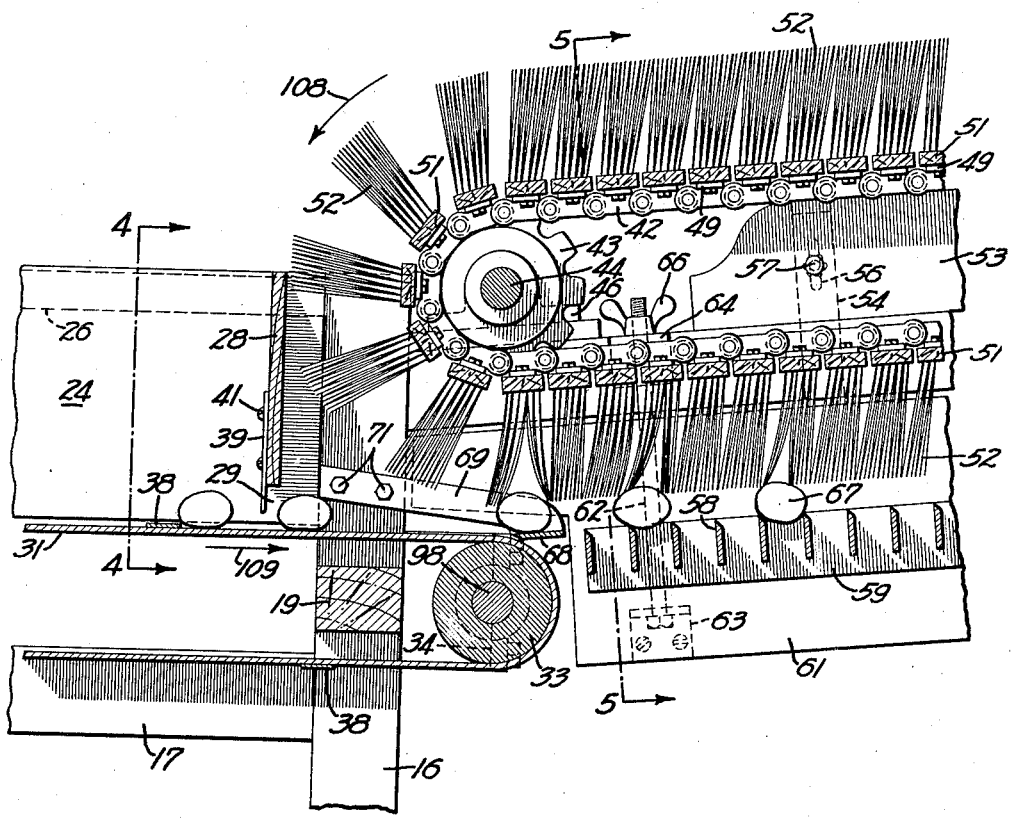
Figure 3 is a vertical sectional view, to an enlarged scale, of that portion of Figure 1 lying in the plane indicated by the line 3—3 of the latter figure.

In putting the invention into practice, I make use of a sorting table, generally indicated by the reference numeral 11, a feed hopper generally indicated by the numeral 12, the huller mechanism generally indicated by the numeral 13, and a washer generally indicated by the numeral 14. All of the above sections of the machine are mounted on a unitary frame comprising spaced pairs of uprights 16 connected together by upper and lower frame members 17 and 18 respectively, and by transverse cross-members 19.

The sorting table 11, on which the harvested nuts may be spread so that the attendant may manually remove any undesired nuts before feeding the remainder into the hulling machine, comprises a box-like receptacle formed of side and end walls 21 and 22 respectively which are attached to the uprights 16, having a porous bottom consisting of a plurality of spaced metal rods 23 which may be secured at each end to a spaced pair of the cross-members 19. The spacing between the rods 23 is such that a normal sized nut will not pass therebetween but all loose portions of husk or other undesired matter may readily drop into a suitable collection receptacle placed beneath the table. One of the end walls 22 of the sorting table does not descend to the top of the rods 23 so that an opening is provided at one side of the table through which the selected nuts may be manually pushed into the feed hopper 12.

The feed hopper comprises a pair of parallel, downwardly converging metal side walls 24, the upper edge of each of which is secured to angle-iron bars 26 secured at their ends to the uprights 16, a downwardly sloping end wall 27 attached to each and at one end of the side walls 24 so as to provide a chute down which the nuts that are discharged from the sorting table may slide, and a vertical end wall 28 secured at its respective vertical side edges to the side walls 24 and terminating short of the lower edge of each of the latter so as to provide a discharge port 29 (see Figures 3 and 4) through which the nuts may pass into the hulling mechanism. The bottom of the feed hopper is formed by one run of an endless belt 31, made of canvas or other suitable material, which is trained over a pair of pulleys 32 and 33 the latter of which is journaled in suitable bearing brackets 34 secured to an opposed pair of uprights 16, and the former of which is journaled in bearing brackets 36, mounted on an opposed pair of frame members 17, which are provided with adjusting screws 37 by means of which a desired tension may be maintained in the belt. Provision is made for creating a maximum amount of traction between the belt and the nuts resting thereon, so as to insure that the nuts are promptly carried out of the feed hopper, by attaching to, and transversely of, the belt a plurality of cleats 38 which may be strips of wood or metal suitably secured, as by riveting, to the belt, or the cleats may be formed of the material of the belt and sewed or otherwise secured thereto. The thickness of the cleats need not exceed $\frac{1}{32}$ of an inch which is sufficient to provide the desired grip between the nuts and the belt. The hopper end wall 28, as is best shown in Figure 4, is provided with a plurality of fingers 39 which are secured to the hopper wall by screws 41 and project downwardly into the discharge opening 29. These fingers are for the purpose of scattering the nuts as they pass through the opening 29 so that an even distribution of the nuts is obtained as the latter are delivered to the hulling mechanism.

Figure 4:
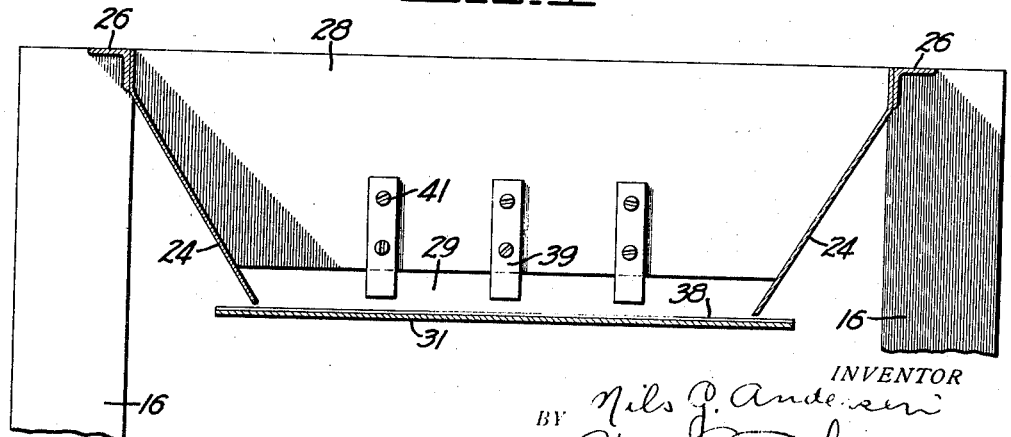
Figure 4 is a vertical sectional view of the feed hopper. The plane of section in which the view is taken is indicated by the line 4—4 of Figure 3.
Figure 5:
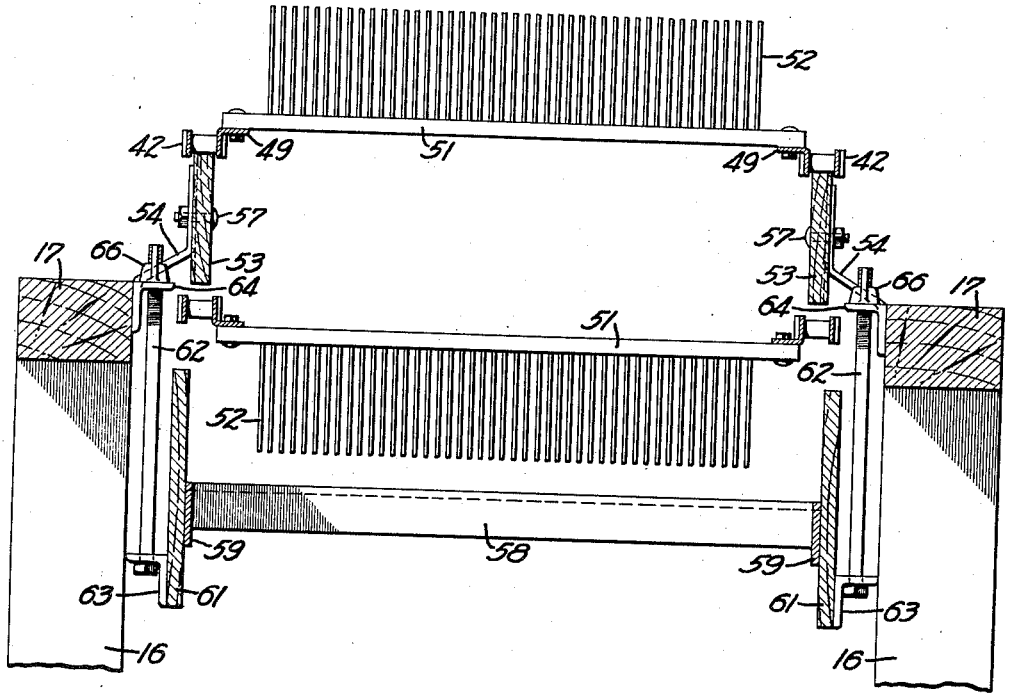
Figure 5 is a vertical sectional view of the brush conveyor and adjacent structure. The plane in which the view is taken is indicated by the line 5—5 of Figure 3.
Figure 6:
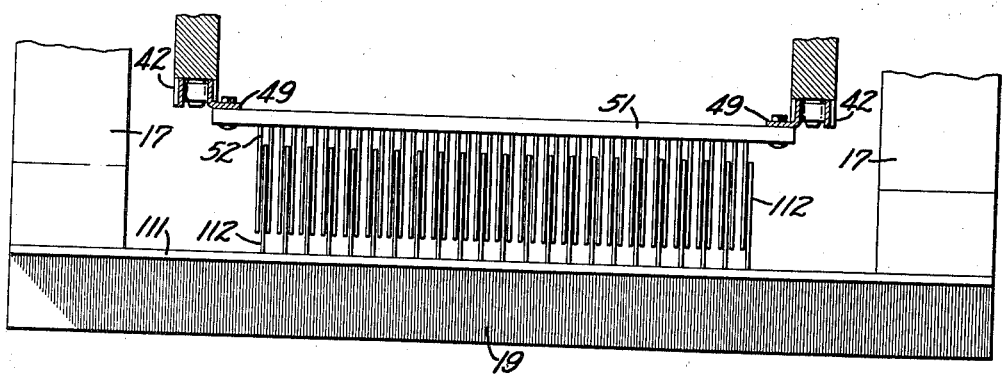
Figure 6 is a fragmental top plan view showing the brush comb. The view is taken looking in the direction of the arrow 6 of Figure 2.

The hulling mechanism, which is best shown in Figure 3, comprises a pair of parallel chains 42, formed in endless loops, the bights of which mesh with spaced pairs of sprockets 43 secured, respectively, to a drive shaft 44, which is journaled in suitable bearing blocks 46 secured to opposite frame members 17, and to an idler shaft 47 which is journaled in adjustable bearing blocks 48 also secured to and at the opposite end of the frame members 17. The adjustable bearing blocks 48 are provided so that a desired tension may be maintained in the chains 42. Each link of each chain is provided with an extended apertured ear 49 for engaging the opposite ends of preferably wooden brush bars 51 in which are secured groups of brush bristles 52. These bristles are composed of spring metal ribbon, which is relatively wide in proportion to its thickness so that the bristles will offer considerable resistance to permanent kinking when bent, and the groups of bristles are uniformly spaced apart longitudinally of the brush bars as is best shown in Figure 5. In order to prevent sagging of the upper run of the chains 42, vertically disposed rails 53, which are mounted on brackets 54 carried by the frame members 17, are provided along the upper edges of which the chains may slide. Vertical adjustment of the rails, to compensate for wear thereof, is provided by forming slots 56 in the brackets 54 through which the mounting bolts 57 pass. Disposed beneath the lower run of the chains 42, and spaced from the distal ends of the brush bristles carried by said runs of the chains, are a plurality of metal bars 58 each beveled to provide an upper cutting edge and preferably welded at their ends to side bars 59. The spaced cutter bars 58 provide a grate over which the nuts may be rolled, as will presently be described, and the spacing between the bars is such that none of the nuts may pass therebetween and fall from the grate or become lodged between the bars so as to halt their progress therealong. The longitudinal side bars 59 are suitably secured to vertically disposed panels 61 which provide side walls at each end of the cutter bars so as to prevent the nuts from falling from the huller at the sides thereof. The entire assembly of cutter bars is adjustably hung from the main frame of the machine by rods 62 which have their lower ends secured, by brackets 63, to the panels 61. The upper end of each rod 62 passes slidably through an apertured bracket 64 secured to a frame member 17 and is threaded to receive a wing nut 66. By rotating the wing nuts the upper edges of the cutter bars 58 may be raised or lowered toward or from the ends of the brush bristles so that the space between the cutter bars and bristles through which the nuts 67 pass may be regulated to suit different sizes of nuts. A horizontally disposed bar or bridge 68 is interposed in the gap between the end of the feed hopper belt 31 and the first cutter bar 58 so as to convey the nuts across the gap and the bar is provided at its ends with arms 69 secured by bolts or screws 71 to a pair of the uprights 16.

Means is provided for driving the feed hopper belt 31 and the chains 42 of the hulling mechanism. As will be seen in Figure 7, one end of the drive shaft 44 is fitted with a friction clutch 72 whose shaft 73, which is adapted to be connected by the clutch to power the drive shaft 44, is driven by suitable worm gearing contained within a gear case 74 mounted on a bracket 76 preferably bolted to the main frame. As is most clearly shown in Figure 1, the power input shaft 77 of the worm gear unit is connected by a flexible coupling 78 to a motor 79 also carried on the bracket 76. The shaft collar 81, which controls the gripping element of the clutch, is of the usual type provided with a peripheral groove 82 which receives the pins 83 of a yoke 84 formed at the upper end of a shift lever 86. The latter lever is pivotally mounted by a pin 87 on a bracket 88 secured to the main frame by bolts 89 and has its lower end pivotally connected by means of a pin 91 to one end of a connecting rod 92. The other end of the connecting rod is attached by a pivot pin 93 to the lower end of a control lever 94 which is pivotally connected intermediate its ends and by a pivot pin 96 to a bracket 97 suitably secured to the main frame. By manually moving the control lever 94, the clutch 72 may be engaged or disengaged to connect or disconnect the motor 79 to drive the drive shaft 44. Secured to ends of the drive shaft 44 and the shaft 98 of the feed hopper belt pulley 33 are sprockets 99 and 101 over which is trained an endless chain 102 whose lower loop or bight passes around an idler sprocket 103 journaled on a suitable shaft 104 supported by a bracket 106 which is secured by bolts 107 to one of the uprights 16.

Assuming that the clutch 72 is engaged to connect the shafts 73 and 44 together and that the motor 79 is running, the rotation created in the drive shaft 44 will cause the brush drive chains 42 to move in the direction indicated by the arrow 108 of Figure 3. Rotation of the shaft 44 will also transmit counter-rotation to the feed belt shaft 98 through the chain 102. As the feed belt moves, in the direction of the arrow 109 of Figure 3 and at a rate slightly slower than the linear velocity of the brush chains, any nuts 67 which may be in the feed hopper will be carried by the belt through the discharge opening 29 and toward one end of the cutter bar unit. Prior to reaching the return loop of the feed belt, successive nuts will be picked up by the descending brush bristles and carried over the bridge member 68 onto the first of the cutter bars 58. Continued movement of the brushes will carry or roll the nuts over the tops of successive cutter bars until the other end of the cutter bar unit is reached. During passage of the nuts, the husks thereof are subjected to the sharp upper edges of the cutter bars and to the rasping action of the ends of the brush bristles with the result that the husks are quickly scored and torn from the nuts leaving the shells of the nuts relatively clean. The separated portions of the hulls will, almost immediately after they are separated from the nut shells, drop out of the machine through the openings between the cutter bars and will not remain as in other machines to be pulverized and forced back into the crevices or wrinkles of the nut shells from where it is very difficult to subsequently remove them.

During the process of chipping or tearing the husks from the nuts, some of the larger particles of the husks will become wedged between the brush bristles. In order to prevent the accumulation of such particles in the brushes, which would foul the latter, I provide means for clearing the brushes after each cycle of movement thereof over the cutter bars. Attached to a pair of uprights 16, at the discharge end of the cutter bar unit, is a metal bar 111 disposed close to the outer tips of the brushes where they swing around the chain loop to start their return movement toward the feed hopper. Preferably welded or brazed to this bar are a plurality of narrow metal comb teeth 112 which are spaced to enter between alternate pairs of spaced groups of brush bristles. These comb teeth, in the event that particles of husk are retained between the bristles of the brush, serve during movement of the brush to engage the particles, if the latter extend into the space between the bristle groups, and dislodge them, whereupon they may fall from the machine.

After the nuts have passed through the hulling unit, numerous loose chips of the husks will still be clinging to the nut shells and, in order to remove these and any dirt which the shells may carry, the nuts are preferably washed. The washer of my mechanism comprises a cage-like drum made up of a plurality of circular bands 113 to which are welded a plurality of parallel rods 114 spaced apart circumferentially around the hoops at distances which will preclude the nuts falling between the rods and out of the drum. The axis of the drum is preferably tilted downwardly so that nuts which enter the drum from the discharge end of the huller will move along the drum by gravity toward the discharge end of the latter. A sheet metal spout 116 attached to the frame and projecting into the washing drum serves to conduct the hulled nuts into the drum. The axle on which the drum is rotated may conveniently be a pipe 117 which is perforated within the drum and connected to a supply line 118 through which water under pressure may be passed to create a spray within the washing drum. The lower end of the pipe is journaled in a suitable bearing 119 carried by the main frame and the upper end of the pipe which is capped or plugged is journaled in a bearing 121 and is fitted with a sprocket engaging a drive chain 122 which also engages a smaller sprocket of a jack shaft journaled in a bearing bracket 123 carried by the frame. The jack shaft derives its power from the shaft 47 through a pair of miter gears 124. Thus, as the machine is running, the washer drum will be rotated to tumble the nuts contained therein so as to expose them to the wash spray. Upon discharge of the cleaned nuts from the end of the washing drum, the former may be dried or sacked in their moist state.

From the foregoing description of my invention, it will be seen that the nuts, during their traversal of the cutter bar unit or grate, are subjected by the cutting edges of successive cutter bars and the sharp ends of the multitude of brush bristles with which the nuts come in contact to numerous cuts and gougings with the result that the husk, no matter how firmly the latter may be attached to the nut shell, is rapidly disintegrated and separated from the shell. The open structure of the cutter bar grate invites the immediate passage of the hull particles from the machine, since there are no horizontal surfaces upon which they may lodge and possibly cause or contribute to clogging of the hulling mechanism. A machine so constructed is obviously capable of rapid and trouble-free operation and has an output capacity greatly in excess of the machines of similar character now on the market.

I claim:

1. In a machine for hulling nuts, a supporting frame, a hopper for receiving said nuts having a a discharge opening therein and mounted on said supporting frame, a traveler passing through said hopper for conducting the nuts therein toward and through said discharge opening, a horizontal cutter bar frame having thereon a plurality of spaced horizontal cutter bars in substantially planar alinement with the discharge opening of said hopper and transversely over which the nuts issuing form said opening may pass, chains movably supported on said frame and positioned above and transversely of said cutter bars, brushes attached to said chains having the bristles thereof extending toward said cutter bars whereby a passage is provided between the cutter bars and the distal ends of the bristles through which said nuts may pass, means for driving said chains horizontally over said cutter bars, and adjustable means connecting said frame and said cutter bar frame whereby the latter may be raised and lowered relative to said frame.

2. In a machine for hulling nuts, a supporting frame, a hopper for receiving said nuts having a discharge opening therein and mounted on said supporting frame, a traveler passing through said hopper for conducting the nuts therein toward and through said discharge opening, a horizontal cutter bar frame having thereon a plurality of spaced horizontal cutter bars in substantially planar alinement with the discharge opening of said hopper and transversely over which the nuts issuing from said opening may pass, a pair of shafts having sprockets thereon journaled on said frame, a pair of spaced endless chains meshing with said sprockets and disposed horizontally above and in spaced transverse relation to said cutter bars, a plurality of brush blocks extending between and secured at their respective ends to said chains, metallic spring bristles secured to and rising from said blocks, said bristles in the portions of said chains confronting said cutter bars terminating in spaced relation to the latter so as to provide between the ends of the respective bristles and the cutter bars a passage through which said nuts may pass, means for driving one of said shafts to rotate the latter, and means for raising and lowering said cutter bar frame.

3. In a machine for hulling nuts, a supporting frame, a hopper for receiving said nuts having a discharge opening therein and mounted on said supporting frame, a traveler passing through said hopper for conducting the nuts therein toward and through said discharge opening, a horizontal cutter bar frame having thereon a plurality of spaced horizontal cutter bars in substantially planar alinement with the discharge opening of said hopper and transversely over which the nuts issuing from said opening may pass, a pair of shafts having sprockets thereon journaled on said frame, a pair of spaced endless chains meshing with said sprockets and disposed horizontally above and in spaced transverse relation to said cutter bars, a plurality of brush blocks extending between and secured at their respective ends to said chains, groups of metallic spring bristles secured to and rising from said blocks in groups spaced longitudinally of said blocks, a plurality of fixed members mounted on said frame and entering the spaces between said groups of bristles, said bristles in the portions of said chains confronting said cutter bars terminating in spaced relation to the latter so as to provide between the ends of the respective bristles and the cutter bars a passage through which said nuts may pass, means for driving one of said shafts to rotate the latter, and means for raising and lowering said cutter bar frame.

4. In a machine for hulling nuts, a supporting frame, a hopper for receiving said nuts having a discharge opening therein and mounted on said supporting frame, a traveler passing through said hopper for conducting the nuts therein toward and through said discharge opening, a horizontal cutter bar frame having thereon a plurality of spaced horizontal cutter bars in substantially planar alinement with the discharge opening of said hopper and transversely over which the nuts issuing from said opening may pass, a pair of shafts having sprockets thereon journaled on said frame, a pair of spaced endless chain meshing with said sprockets and disposed horizontally above and in spaced transverse relation to said cutter bars, a plurality of brush blocks extending between and secured at their respective ends to said chains, metallic spring bristles secured to and rising from said blocks, said bristles in the portions of said chains confronting said cutter bars terminating in spaced relation to the later so as to provide between the ends of the respective bristles and the cutter bars a passage through which said nuts may pass, means for driving one of said shafts to rotate the latter, means connecting said latter shaft and said hopper traveler for movement together, and means for raising and lowering said cutter bar frames.

5. In a machine for hulling nuts, a supporting frame, a hopper for receiving said nuts mounted on said frame having an open bottom and a discharge opening at one side thereof, spaced shafts having pulleys thereon mounted on said frame below said hopper, an endless belt tractionally engaging said pulleys and closing the bottom opening of said hopper to provide the bottom of the latter, cleats attached to and extending transversely of said belt, said cleats being adapted to engage nuts contained within said hopper to convey said nuts toward and through said hopper discharge opening, a pair of brush chain shafts journaled in horizontal spaced relation on said frame, spaced sprockets on and secured to each of said brush chain shafts, parallel endless brush chains meshing with said sprockets, rail members secured to said frame and slidably engaging said brush chains, brush blocks extending between and secured at their respective ends to said brush chains, metallic spring bristles secured to and rising from each brush block, means for driving one of said brush chain shafts, means connecting one of said brush chain shafts and one of said aforementioned spaced shafts for rotation together, a cutter bar frame, spaced horizontally disposed cutter bars carried by said cutter bar frame and disposed below and in spaced transverse relation to said brush chains whereby a passage of predetermined width is provided between said cutter bars and the distal ends of the bristles of said brush blocks into which nuts issuing from the discharge opening of said hopper may pass, rods secured at one end thereof to and rising from said cutter bar frame, said rods having threads at the other end thereof, brackets mounted on said frame having apertures therein through which the threaded ends of said rods pass, and nuts on the threaded ends of said rods and engaging said brackets.

NILS G. ANDERSEN.